Patented Jan. 16, 1951

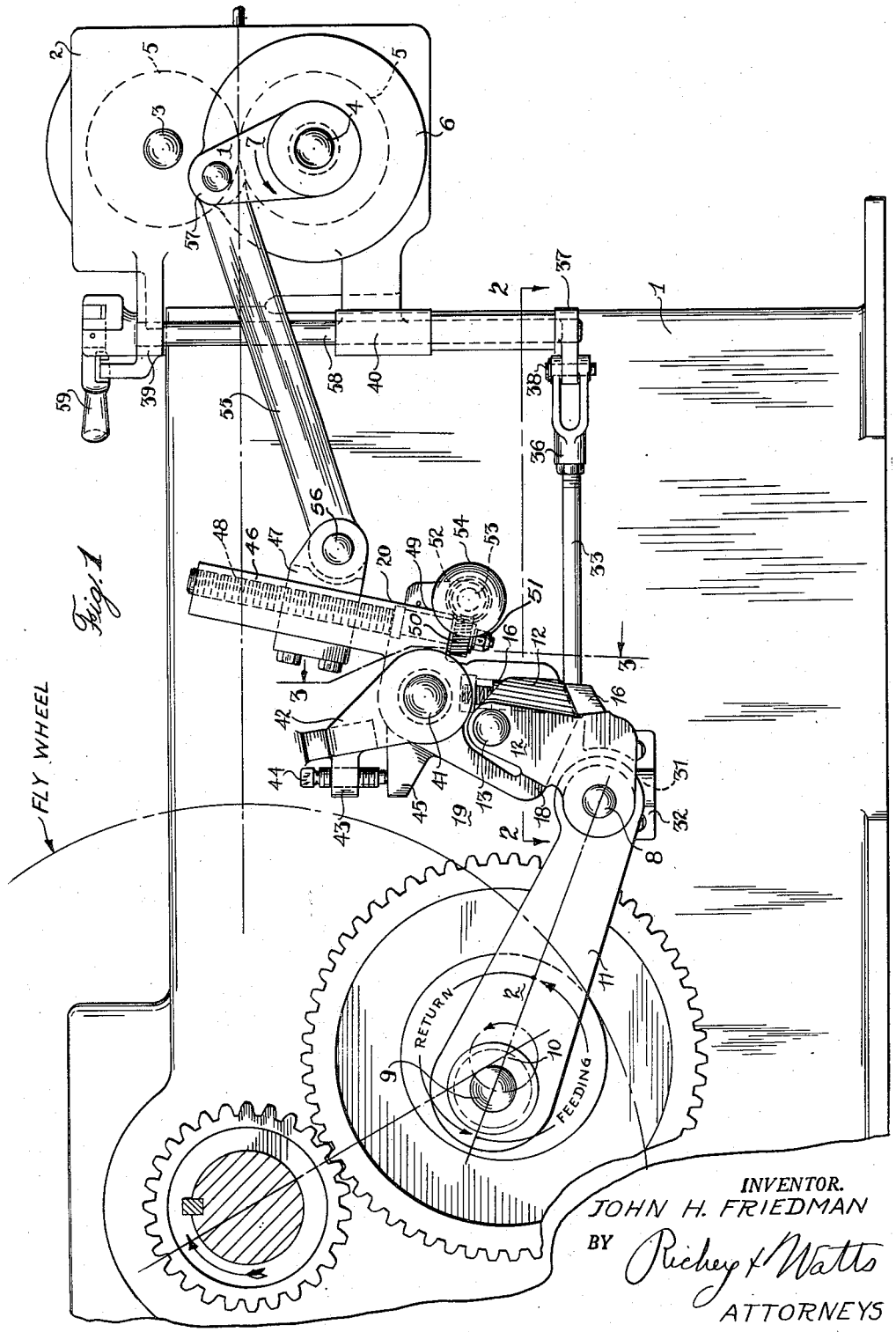

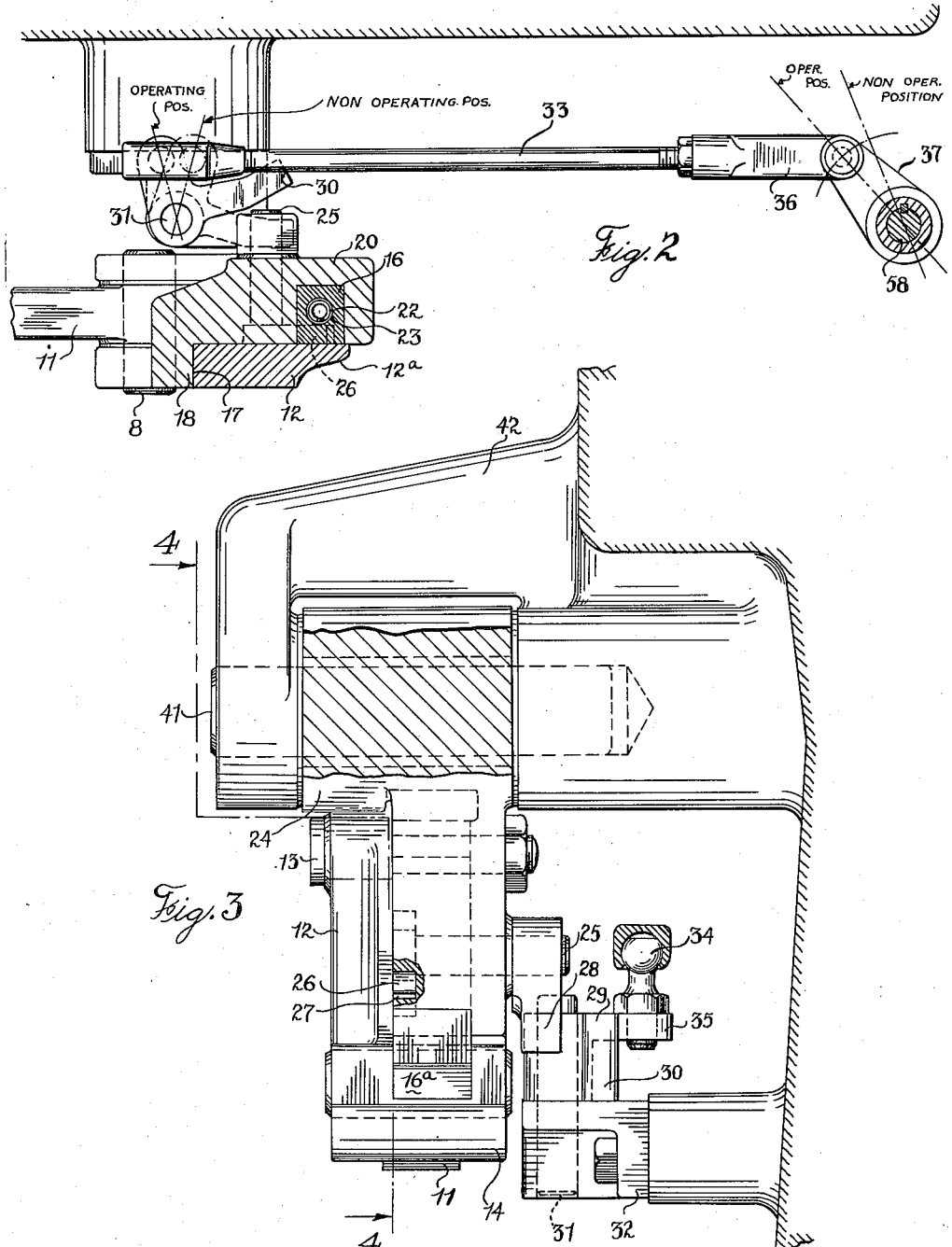

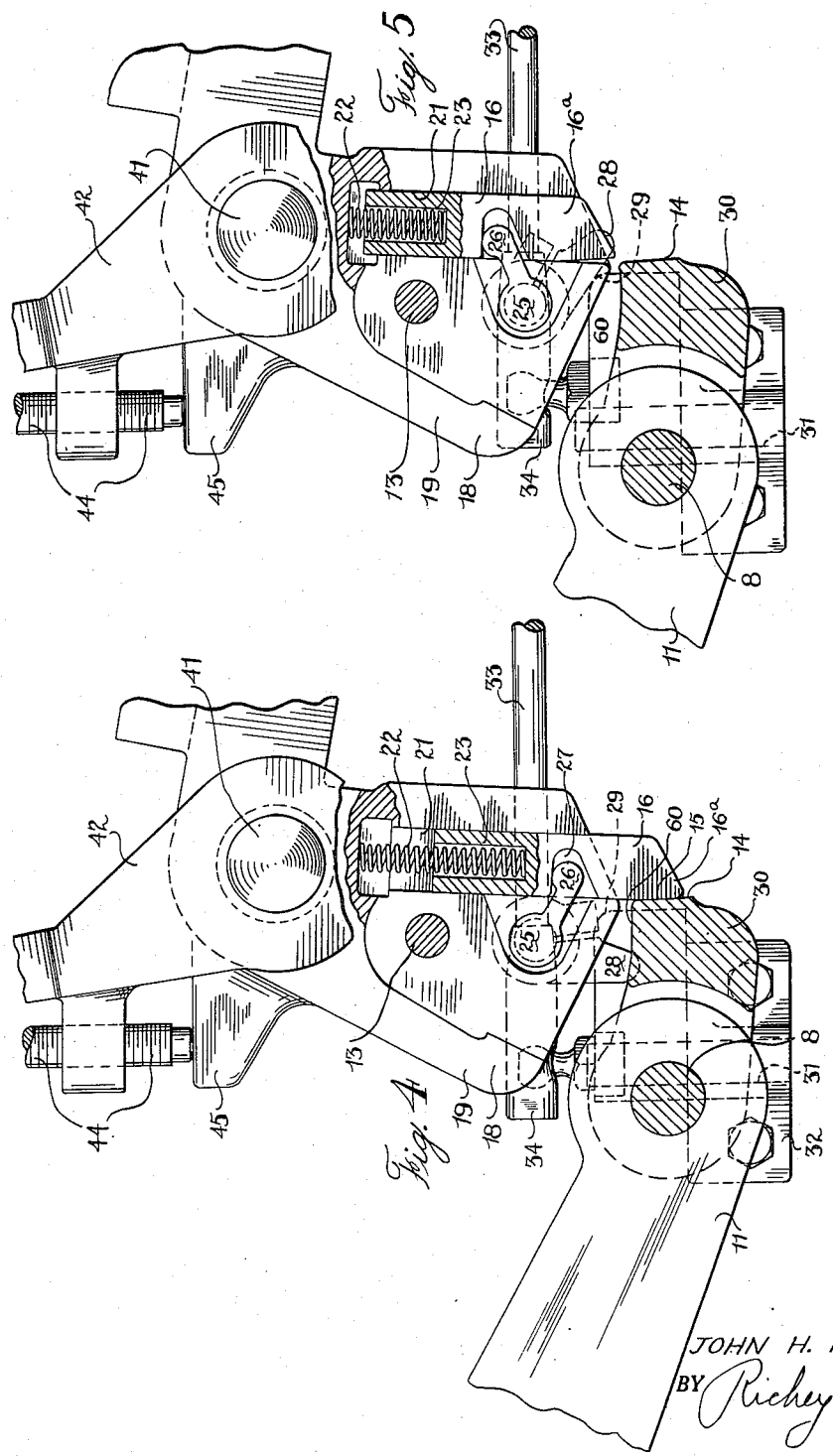

2,538,619

UNITED STATES PATENT OFFICE 2,538,619

FEED SHUTOFF MECHANISM FOR INTERMITTENT DRIVES

John H. Friedman, Tiffin, Ohio, assignor to The National Machinery Company, Tiffin, Ohio, a corporation of Ohio Application January 31, 1946, Serial No. 644,531

8 Claims. (Cl. 74—119)

This invention relates to stock feed mechanism for metal working machines, and more particularly to an improved means for engaging and disengaging the stock feed mechanism.

A stock feed mechanism for a cold header is illustrated in Patent No. 1,856,027 which issued April 26, 1932, to W. L. Clouse. Generally speaking, machines of this variety include a stationary die, a heading tool mounted on a header slide and movable toward and away from the die to effect the heading, an intermittent feed mechanism to feed the proper length blanks, shearing mechanism to shear off the desired lengths of blanks, and transfer mechanism for transferring the severed blanks into proper position relative to the die so that they may be headed by the blow of the heading tool.

Machines of the type to which this invention relates feed the stock intermittently. As shown in the patent cited above, it is customary to drive the feed mechanism from a continuously rotating power drive device and to provide means whereby a reciprocating intermediate member drives a feed ratchet, this ratchet in turn driving the stock feed rollers. With this arrangement a cycle is produced. During the feeding part of the cycle the reciprocating member turns the ratchet in one direction and the ratchet, in turn, drives the feed rollers. During the return part, or non-feeding portion of the cycle, the reciprocating member turns the ratchet in the opposite direction, but now the ratchet rides clear and the feed rollers are not driven.

It is also customary in many of such devices to provide means whereby the stock feed driving mechanism can continue to run without causing rotation of the ratchet and hence the feed rollers. This result has been commonly obtained by providing some sort of locking means between the parts, which locking means can be positioned to permit the reciprocating driving members of the feed drive to be driven without moving the feed drive ratchet.

The devices in the prior art were designed so that the feed drive mechanism became disengaged from the ratchet just at the end of the feed cycle. It so happens, that in the type of machine to which this invention relates, the load is particularly heavy at the end of the feeding cycle because the stock is fed against a positive stop and the feed rollers must slip a small amount. With this arrangement, the operating parts are under great tension near the end of the feeding cycle. In fact, near the end of the stroke, the load is so great in a machine of this nature that the various members driving the ratchet tend to stretch or distort slightly, the result being that in the prior devices the ratchet member was not driven quite as far when operating under load as it was driven when not under load. Now, when the drive mechanism was disengaged from the ratchet at the end of the feed stroke, as occurred in the prior devices, the first portion of the return stroke merely relieved the tension on the driving member. Then, after completion of the return stroke, when the driving members made what would normally be their next feeding stroke, since the parts were not under load, they had no tendency to stretch, and, as mentioned before, with the machine idling, the ratchet driving member was driven farther than it was driven when under load. Under these conditions, the driving member would strike the stationary ratchet member near the end of the idle feed stroke. This caused a slight additional feeding of the stock, and this stock, in turn, was sheared off and the resultant slivers worked their way into the die causing serious trouble. It is an object of this invention to entirely eliminate any tendency to feed during the idling condition, and so to eliminate the attendant difficulty of short feeding, or "nibbling."

Broadly, this desirable result is obtained in the present invention by providing means for disengaging the feed drive during the return, or non-feeding stroke, the disengagement taking place after all tension in the parts has relaxed and the parts are not under load. This has the additional advantage of reducing wear and shock which might eventually render the disengaging mechanism inoperative.

Another object is to provide a disengaging device which is fool proof, in that it cannot cause disengagement of the feed except during the return stroke.

A further object is to provide a disengaging device which can be set to the operating or feeding position during any part of either stroke, the feeding being engaged automatically at the beginning of the next feed stroke.

The above noted objects of my invention will appear from the following description of several embodiments thereof, reference being had to the accompanying drawings, in which—

Fig. 1 is a side elevation of the mechanism.

Fig. 2 is a partial plan and section on line "2—2" in Fig. 1.

Fig. 3 is a partial elevation of disengaging mechanism approximately on a line "3—3" in Fig. 1.

Fig. 4 is a side view of Fig. 3 on the line "4—4" with the parts in the latched position.

Fig. 5 is a similar view to Fig. 4 with parts in unlatched position.

In the side elevation Fig. 1, 1 is the bed of the machine of which the device is a part; and attached to said bed 1 is shown a feed box 2 which houses the driven unit for feeding the stock into the machine. These driven parts comprise upper and lower shafts 3 and 4 respectively, feeding rolls 5 being fixed to the farther end of each shaft.

The lower shaft 4 is driven by any type of conventional feeding ratchet 6 which engages and revolves the lower shaft 4 when the ratchet mechanism is moved in the direction of arrow 7. The ratchet mechanism is disengaged from the shaft when it is moved in the opposite direction. The details of the ratchet mechanism form no part of this invention and are therefore not illustrated.

The feed mechanism may be driven by any means which will provide a reciprocating motion to the feed driving mechanism. In Fig. 1 the driving means is shown as a crank pin 9 revolving about a center 10 in the bed 1. This crank pin revolves counter-clockwise and imparts the necessary reciprocation to pin 8 thru driving arm 11.

Pin 8 is also fitted to a first pivoted member in the form of a swinging arm 12 which is pivotally mounted on pin 13. Arm 12 is provided with an extended part 14 which engages at 15 the lower end of sliding pin 16 in the operating position, as will be explained presently. Arm 12 is also provided with an abutment 17 shown in contact with an abutment 18 on the lower extension 19 of a second pivoted member in the form of a lever 20. Lever 20 is provided with a slot 21 in which the sliding pin 16 may be raised or lowered. Cheek 12a on lever 12 aids in retaining the pin.

As seen in Fig. 4, the pin 16 is urged to the lowered position by spring 22 which sets into hole 23 in pin 16 and its upper end rests against hub portion 24 of lever 20. With the pin 16 in the lowered position, the swinging arm 12, being in engagement with pin 16 on one side and abutment 18 of lever 20 on the other side, is prevented from free rotation about pin 13 and hence forces lever 20 to oscillate in synchronism with arm 12. This causes the ratchet to reciprocate which, in turn, causes the feed rollers to feed intermittently. Broadly speaking, pin 16 and shoulder 15 form a locking means which causes the reciprocating feed driving mechanism to drive the feed mechanism when engaged and which renders the reciprocating feed driving mechanism inoperable to drive the feed mechanism when disengaged. In other words, the feed driving mechanism includes two elements which may be coupled and de-coupled by the locking means. The driven element of the feed drive mechanism is connected more or less permanently to the ratchet or to an equivalent feed roll turning device that transposes reciprocation of the feed driving mechanism to intermittent uni-directional rotation of the feed rolls, whereas the driving element is connected to the means that imparts reciprocation thereto.

Referring to Figs. 4 and 5 it can be seen in side elevation that the pin 16 is raised by a lift or cam device consisting of a shaft 25 freely fitted into lever 20 and provided at the one end with cam lever 26, which extends into a notch 27 in sliding pin 16. An end view of shaft 25 also appears in Fig. 3 and a plan view in Fig. 2. Referring to Figs. 4 and 5, to the outer end of shaft 25 is fixed an arm 28 which arm actuates the cam lever 26 to raise the sliding pin.

In order that the locking means may be disengaged at will during a return stroke, a selectively positionable release means is provided which may be manipulated by the operator.

As seen in Fig. 2, this release means includes a tripping cam or arm 30 carried on a pin 31 mounted in a bracket 32 fixed to the bed casting 1. Cam or trip arm 30 may be put in either of two positions by a rod 33, equipped at one end with ball and socket joint 34, which is attached to an extended lever portion 35 of cam member 30. The other end of rod 33 is fitted with a clevis 36 connected by pin 38 to a lever 37. Lever 37 is fixed to the lower end of rod 58, to the upper end of which is attached a hand lever 59 and said rod 58 supported at 39 and 40 by extension lugs on feed box 2. Lever 59 is latched into operating or non-operating position by any convenient method. The operation of the device in each position will be described after this general description is completed.

As mentioned before, when the pin 16 is in the lowered position and arm 12 and lever 20 are locked together, lever 20 then oscillates about pin 41 set into bed 1 and extended bracket portion 42 of bed 1. This is best seen in Fig. 2.

Extending from the fixed bracket portion 42, is a lug 43 provided with an adjusting set screw 44, which is so adjusted that it will only engage lug 45 extending from hub portion 24 of lever 20, if said lever tends to rotate clockwise on pin 41 during the time sliding pin 16 is raised out of engagement with arm 12.

In order that the feed may be adjusted, the upper portion 46 of lever 20 houses a sliding block 47 into which screw 48 is threaded. Screw 48 is supported in the solid portion 49 of lever 20 and to its lower portion is keyed a helical gear 50, held in place by nut 51, and engaging another helical gear 52 on shaft 53, and to the end of which a hand knob 54 is connected. The turning of this knob in clockwise or counter-clockwise direction causes the screw 48 to raise or lower the sliding block 47 which is connected to link 55 thru pin 56. The other end of link 55 is connected to the ratchet 6 thru pin 57.

By reference to Fig. 2 of the drawings, it will be noted that when arm 37 is in the "operating" position, cam 30 entirely clears arm 28 so that sliding pin 16 remains in its lowered position, in contact with extended part 14 of arm 12. Since arm 12 is also in contact with lever 20 at abutment 18, the reciprocating motion caused by the crank motion of pin 9 in the "feeding direction" will move the lever 20 counter-clockwise about pin 41 in the bed. This, in turn, will rotate the feed ratchet 6 in the feed direction, causing the feed rolls to feed into the machine the proper amount of stock, depending on the adjusted position of sliding block 47.

As the crank motion of pin 9 is moved thru that part of its stroke indicated as "return," the lever 20 is moved in clockwise direction, as is also the ratchet 6, but during this part of the cycle the ratchet has disengaged from its housing and there is no motion imparted to the feed rolls 5.

If the selectively positionable release lever 59 (Fig. 1) is held toward the non-operating position, it will be first noted that the tripping cam 30 merely bears against arm 28. Cam 30 cannot pass under arm 28 until lever 20 has turned to the extreme counter-clockwise position. Tripping cam 30 can then swing over into the position shown in dotted lines in Fig. 2, that is, behind arm 28. Now, as the lever 20 begins to rotate in a clockwise direction, arm 28 is pulled against face 29 of cam 30 causing arm 28 to turn shaft 25 and thence turn lever 26. This lifts pin 16 so that it moves out of contact with extended part 14 of arm 12. It will be seen that before pin 16 completely clears extended part 14 of arm 12, arm 12, lever 20 and the remainder of the ratchet drive mechanism all move together for the first portion of the return cycle. During this initial portion of the return cycle, all tension and loading of the parts is relieved, so that when pin 16 finally frees arm 12 from lever 20 the parts are not under load and the locking means is disengaged. Since all spring or elongation of the parts is removed before the parts are disengaged in the present invention, there is no tendency for the continuously moving part to strike the fixed part with resultant undesirable short feeding, or "nibbling."

It will be seen that if the selectively positionable release lever is maintained in the non-operating position, the arm 28 is held in this position by cam 30 and the pin 16 is kept in the raised position. On what would normally be the feed stroke, arm 12 is free to oscillate about pin 13 without imparting any motion to lever 20 and hence lever 20 does not operate ratchet 6.

If the cam 30 is withdrawn from under the arm 28 at any time, other than when the arm 12 is at its extreme clockwise position, the pin 16 will drop upon and slide across surface 60 (Figs. 4 and 5) of extended portion 14 of arm 12, until arm 12 has reached the extreme clockwise position. The spring 22 will force pin 16 downward into engagement with part 14 of arm 12, and on the next feed stroke the arm 12 and lever 20 are locked together.

It will be noted that once the locking means is disengaged it can be re-engaged only at the very beginning of a feed stroke. The reason for this lies in the fact that even though the elements of the feed driving mechanism be de-coupled for feeding, they remain coupled by means of abutment 18 long enough to complete the return stroke. Thus, the lever 20 remains in the position corresponding to the very beginning of the feed stroke, which is the only position at which it can be re-coupled to the balance of the feed driving mechanism. This makes it impossible for the device to feed less than a full length of stock upon re-engaging the feed drive.

As mentioned before, in most other devices now in use, the parts become disengaged just at the end of the "feeding" part of the cycle, at which time these parts are still under feeding pressure. This results in objectionable short feeding, which causes "nibbling" (the shearing of slivers) off the end of the stock during the time the feed mechanism is shut off and the normal feeding is discontinued. On the other hand, in my invention, all parts are in their normal or operating position during part of the return cycle, and the parts are not disengaged until all tension is relieved, so that the lever 20 is always left in the same position regardless of whether the feed happens to be engaged or disengaged for the next cycle.

It can also be seen that there is an additional advantage of this arrangement in that the disengagement of the locking means is effected during the return stroke, at which time it may be accomplished easily with no shock or heavy loads imparted to the mechanism.

Although my device has been described in conjunction with a mechanism to drive stock feed rollers, it will be apparent to those skilled in the art that the stock feeding members could be in the form of grippers or any other common feed mechanism without modifying the operation of my novel feed disconnect arrangement.

Having thus described the present invention so that others skilled in the art may be able to understand and practice the same, I state that what I desire to secure by Letters Patent is defined in what is claimed.

What is claimed is:

1. In a stock feed device for metal working machinery, intermittent stock feed members, feed driving mechanism including a pivoted lever connected to drive said feed members and a reciprocating driving member for said lever, rotating means to reciprocate said driving member, locking means for connecting said driving member to said lever, and release means to move said locking means to a position where the driving member is uncoupled from said lever so that said member can be driven continuously without moving said lever and feed mechanism, and means preventing said release means from moving said locking means during the feeding part of the cycle.

2. In a stock feed device for metal working machinery, intermittent stock feed members, feed driving mechanism including a pivoted lever connected to drive said feed members and a reciprocating driving member for said lever, rotating means to reciprocate said driving member, locking means for connecting said driving member to said lever, and release means to move said locking means to a position where the driving member is uncoupled from said lever so that said member can be driven continuously without moving said lever and feed mechanism, and means preventing said release means from moving said locking means during the feeding part of the cycle, and means on said driving member which prevent recoupling of the driving member to said lever at all times except at the very beginning of the feed stroke.

3. A driving device for the intermittent feed mechanism of a metal working machine comprising a driving crank, a driving member pinned to said crank, a swinging arm pinned to said driving member, a feed mechanism driving lever, pivot means connecting said swinging arm to said feed driving lever, abutment means between said swinging arm and said lever for driving said lever in one direction, movable locking means between said swinging arm and lever for driving said lever in the other direction, said locking means providing the drive during the feed stroke, means to disengage said locking means during the nonfeeding stroke, and means to prevent disengagement of said locking means during the feed stroke.

4. A driving device for the intermittent feed mechanism of a metal working machine comprising a driving crank, a driving member pinned to said crank, a swinging arm pinned to said driving member, a feed mechanism driving lever, pivot means connecting said swinging arm to said feed driving lever, abutment means between said swinging arm and said lever for driving said lever in one direction, movable locking means between said swinging arm and lever for driving said lever in the other direction, said locking means providing the drive during the feed stroke, means to release said locking means during the nonfeeding stroke, and means on said driving lever for engaging said release means so that it cannot actuate said locking means during the feed stroke.

5. Means for driving an intermittent ratchet stock feed device for metal working machines comprising rotating eccentric drive means, reciprocating feed driving mechanism having a driven element for connection with the ratchet feed means and a driving element connected to said eccentric drive means to cause reciprocation of the driving element of said reciprocating feed driving mechanism from a first to a second position on a feed stroke and from the second to the first position for a return stroke, means for coupling said elements, said coupling means including an abutment on each element engageable to couple said elements for return motion only whenever said driving element is moving on its return stroke with said driven element displaced from its first position, said coupling means also including a latch movably mounted on one of said elements and engageable with the other element to couple said elements for feed motion only, release means movable to a position to release said latch to permit said driving element to reciprocate independently of the driven element in the direction of feed, and means movable with said driving element to prevent motion of said release means to its release position during the feeding stroke.

6. Means for driving an intermittent ratchet stock feed device for metal working machines comprising rotating eccentric drive means, reciprocating feed driving mechanism having a driven element for connection with the ratchet feed means and a driving element connected to said eccentric drive means to cause reciprocation of the driving element of said reciprocating feed driving mechanism from a first to a second position on a feed stroke and from the second to the first position for a return stroke, means for coupling and uncoupling said driving and driven elements, release means movable toward a position to engage said coupling means and move the latter to uncouple said driving and driven elements, said uncoupling causing said driving element to continue its motion in the direction of feed independently of the driven element, and means movable with said driving element to prevent said release means from reaching its operative uncoupling position during the feeding stroke.

7. In an intermittent stock feed device for metal working machinery, feed device driving mechanism including a first pivoted member, reciprocating driving means for oscillating said first pivoted member, a second pivoted member, means on said second member for driving connection with intermittent stock feed members, facing abutments on said pivoted members disposed for engagement when said first pivoted member turns in one direction and thereby carries said second pivoted member with it to cause the associated intermittent stock feed device to idle, latch means carried by said second pivoted member, said latch means being movable to a drive position wherein it is engaged by said first pivoted member when the latter turns in the other direction to cause the associated intermittent stock feed device to feed, said latch means being movable to a release position wherein it is clear of said first pivoted member, release means movable to a release position to cause said latch means to move to its release position, and means on said second pivoted member for engaging said release means to prevent said release means from moving to its release position during the feed stroke.

8. In an intermittent stock feed device for metal working machinery, feed device driving mechanism including a first pivoted member, reciprocating driving means for oscillating said first pivoted member, a second pivoted member, means on said second member for driving connection with intermittent stock feed members, facing abutments on said pivoted members disposed for engagement when said first pivoted member turns in one direction and thereby carries said second pivoted member with it to cause the associated intermittent stock feed device to idle, latch means carried by said second pivoted member, said latch means being movable to a drive position wherein it is engaged by said first pivoted member when the latter turns in the other direction to cause the associated intermittent stock feed device to feed, said latch means being movable to a release position wherein it is clear of said first pivoted member, cam means on said latch means, release means movable to a release position in the path of said latch cam means when said second pivoted member is moving on the idle stroke to cause said latch means to move to its release position, and means movable with said second pivoted member for engaging said release means to hold the latter from moving to its release position during the feed stroke.

JOHN H. FRIEDMAN.

REFERENCES CITED

The following references are of record in the file of this patent:

UNITED STATES PATENTS

| Number | Name | Date |
|---|---|---|
| 1,014,829 | Lepper | Jan. 16, 1912 |
| 1,194,452 | Wilcox | Aug. 15, 1916 |
| 1,718,265 | Ward | June 25, 1929 |
| 1,856,027 | Clouse | Apr. 26, 1932 |
| 2,192,016 | Petitjean | Feb. 27, 1940 |
| 2,254,316 | Rider | Sept. 2, 1941 |
| 2,311,903 | Wilcox | Feb. 23, 1943 |